(12) United States Patent
Dodal et al.

(10) Patent No.: US 9,083,180 B2
(45) Date of Patent: Jul. 14, 2015

(54) COMBINATION GFCI/AFCI RECEPTACLE WITH CLASS 2 POWER UNITS

(75) Inventors: Rohit Sumerchand Dodal, Peachtree City, GA (US); Carlos Eduardo Restrepo, Atlanta, GA (US); Alex Zhuang, Shanghai (CN); Edward Gu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 663 days.

(21) Appl. No.: 13/108,472

(22) Filed: May 16, 2011

(65) Prior Publication Data

US 2012/0292991 A1    Nov. 22, 2012

(51) Int. Cl.
*H02J 3/34* (2006.01)
*H02H 3/16* (2006.01)

(52) U.S. Cl.
CPC ........................ *H02H 3/16* (2013.01)

(58) Field of Classification Search
USPC ........................................................... 307/11
See application file for complete search history.

(56) References Cited

U.S. PATENT DOCUMENTS

| | | | |
|---|---|---|---|
| D429,694 S | 8/2000 | Schlessinger et al. | |
| D430,539 S | 9/2000 | Leopold et al. | |
| D432,990 S | 10/2000 | Stekelenburg | |
| D462,660 S | 9/2002 | Huang et al. | |
| D531,121 S | 10/2006 | Fort et al. | |
| D535,256 S | 1/2007 | Fort et al. | |
| D536,305 S | 2/2007 | Fort et al. | |
| D542,223 S | 5/2007 | Bazayev et al. | |
| D545,272 S | 6/2007 | Zhang et al. | |
| D558,676 S | 1/2008 | Fort et al. | |
| D568,817 S | 5/2008 | Yu | |
| D573,952 S | 7/2008 | Schwartz | |
| D598,859 S | 8/2009 | Vaccaro et al. | |
| D601,962 S | 10/2009 | Song | |
| D604,873 S | 11/2009 | Richter et al. | |
| 7,862,350 B2* | 1/2011 | Richter et al. | 439/107 |
| 8,018,750 B2* | 9/2011 | Unger et al. | 363/146 |
| D674,753 S | 1/2013 | Jansen et al. | |
| D679,256 S | 4/2013 | Ericksen et al. | |
| D680,953 S | 4/2013 | Kuo | |
| 8,441,216 B2* | 5/2013 | Brownlee | 315/362 |
| D693,305 S | 11/2013 | Kuo et al. | |

(Continued)

OTHER PUBLICATIONS http://www.pilotmedia.us/wordpress/admin/features/rapid-usb-charger-ready-to-come-aboard; Feb. 18, 2013.

(Continued)

*Primary Examiner* — Rexford Barnie
*Assistant Examiner* — Daniel Kessie
(74) *Attorney, Agent, or Firm* — King & Spalding LLP

(57) ABSTRACT

A combination AC receptacle and low voltage class 2 power units are provided in a standard single strap flush wall-mount outlet so that portable battery operated electronic devices may be charged without having to use a special AC charger. Ground fault circuit interrupter (GFCI) and/or arc fault circuit interrupter (AFCI) capabilities are also provided so that this combination AC receptacle and low voltage class 2 power units, e.g., USB receptacles, may used in occupancy locations requiring such protections under current electrical building codes. A standard wall cover plate is used to finish off installation of this flush wall-mount outlet into a wall outlet box. Also a data interface may be provided to allow a PDA or PC to control smart wiring systems through the USB receptacle.

28 Claims, 6 Drawing Sheets

(56) References Cited

U.S. PATENT DOCUMENTS

| | | |
|---|---|---|
| D694,706 S | 12/2013 | Kuo |
| D694,713 S | 12/2013 | Yeo et al. |
| D695,693 S | 12/2013 | Lee et al. |
| D700,892 S | 3/2014 | Segnit |
| D702,640 S | 4/2014 | Restrepo et al. |
| D703,139 S | 4/2014 | Dodal et al. |
| 8,696,368 B2 | 4/2014 | Quezada |
| D705,170 S | 5/2014 | Diehl et al. |
| 8,758,031 B2 | 6/2014 | Cheng et al. |
| 2008/0140565 A1* | 6/2008 | DeBenedetti et al. .......... 705/39 |
| 2013/0295782 A1* | 11/2013 | Goel ............................... 439/40 |

OTHER PUBLICATIONS http://www.slashgear.com/truepower-outlet-packs-usb-ports-and-ac-for-just-9-95-0465164; Dec. 4, 2009.
http://www.virginiasweetpea.com/2013/01/how-to-add-a-usb-port-to-a-wall-outlet.html; Jan. 16, 2013.

* cited by examiner

COMBINATION GFCI/AFCI RECEPTACLE WITH CLASS 2 POWER UNITS

TECHNICAL FIELD

The present invention relates generally to alternating current (AC) power receptacles and power sources for charging portable electronic equipment, and more particularly, to a combination ground-fault circuit interrupter (GFCI)/arc-fault circuit interrupter (AFCI) receptacle and low voltage class 2 power units in a standard single strap flush wall-mount outlet.

BACKGROUND

A proliferation of portable battery operated electronic devices, e.g., cell phones, PDAs, electronic book readers, portable games players, MP3 music players, digital cameras, etc., have created a need for external power sources to recharge the batteries thereof. Heretofore, specific use battery chargers that plug into a standard AC power wall-mount outlet have been supplied with their respective battery operated electronic device. These battery chargers have been either a step-down transformer with or without AC to direct current (DC) rectification, or an electronic step-down voltage switch mode power supply (SMPS). The battery chargers have generally been configured in a "cube" shape with standard 15 ampere blade prongs that plug into the standard 15 or 20 ampere 120 volt AC general use wall receptacle. A DC low voltage for charging the battery is supplied to the associated electronic device by a cord and matching charger connector.

As technology has advanced and costs have been reduced for these portable battery operated electronic devices, more and more devices have been configured to connect with a Universal Serial Bus (USB) interface that is capable of supplying both data and power to the portable device. Use of a USB interface eliminates the requirement for separate power and data connectors in the portable device. In addition, the USB plug and receptacle are physically robust, and effectively isolate DC voltages from being shorted by accidental external metal contact. USB plug configured battery chargers are produced in both 120 VAC and 13.8 VDC power source voltages. By using a USB plug compatible voltage charging source, the battery in the portable electronic device may also be charged from a personal computer during data transfer operations or just when the portable device is attached to the personal computer with a standard USB cable.

Problems exist however when a USB battery charger has been misplaced, more than one portable device requires charging, and/or a personal computer is not available as a USB charger. Also some inexpensive USB battery chargers are not energy efficient, e.g., poor power factor and/or have excessive idling current draw during non-use (vampire load).

SUMMARY

Therefore, what is needed is a convenient, always available USB compatible battery charging power source that cannot be misplaced, is capable of charging multiple portable electronic devices, and is energy efficient. According to the teachings of this disclosure, a combination AC receptacle and low voltage class 2 power units are provided in a standard single strap flush wall-mount outlet. In addition, a standard outlet box cover plate may be used with the combination AC receptacle and low voltage class 2 power units outlet device, as disclosed herein.

The class 2 power units may be for example, but are not limited to, Universal Serial Bus (USB) interfaces having an output of about 5 volts up to at least 2.1 amperes per USB receptacle. Power may be supplied to each of the USB receptacles by a high efficiency switch mode power supply (SMPS) such as, for example but is not limited to, a power factor corrected flyback switch mode power supply, or any other type of SMPS or transformer derived DC power supply circuit. The primary power for the USB interface power supply is derived from the 120 VAC line voltage to the AC receptacle portion of the flush wall-mount outlet disclosed herein.

A very low power sleep mode circuit may be incorporated into the USB interface power supply so that when substantially no current is being drawn from any of the USB receptacles, the power supply effectively goes into a very low power sleep mode and does not wake up until a load is detected, e.g., current is being drawn therefrom. A microcontroller may be utilized for both control, e.g., pulse width modulation (PWM) control signals, of the SMPS circuits and for detection of whether the USB power source should be in an operational mode or remain in a very low current sleep mode. When in the sleep mode, vampire power draw is substantially reduced.

It is contemplated and within the scope of this disclosure that the control electronics for the class 2 power units may be combined with the control electronics for a ground fault circuit interrupter (GFCI) and/or arc fault circuit interrupter (AFCI), especially when microcontroller computing and control capabilities are available. Both feedthrough and non-feedthrough GFCI and/or AFCI circuits may be utilized in combination with the class 2 power units described herein. This combination facilitates those occupancy areas requiring a GFCI/AFCI device and access to charging power for a battery operated portable electronic device, e.g., bathroom sink, bedroom lamp table, etc.

According to a specific example embodiment of this disclosure, a wiring device having line voltage alternating current (AC) and low voltage class 2 power receptacles, comprises: an electrically insulated housing; a mounting strap attached to the electrically insulated housing and adapted to secure the housing to a branch circuit outlet box; an AC receptacle having a hot contact coupled to a hot AC connection terminal, a neutral contact coupled to a neutral AC connection terminal, and a ground contact coupled to a ground AC connection terminal in the insulated housing; a ground-fault circuit interrupter (GFCI) coupled between the AC receptacle and the connection terminals so that if a ground fault event occurs the GFCI will disconnect the AC receptacle from a source AC voltage connected to the AC connection terminals; an AC line to low voltage direct current (DC) power supply having an AC input coupled to the AC receptacle and a low voltage DC output; and at least one class 2 power receptacle coupled to the low voltage DC output of the AC to low voltage DC power supply, wherein the at least one class 2 power receptacle provides voltage and current for charging a battery in a portable battery operated electronic device.

According to another specific example embodiment of this disclosure, a wiring device having line voltage alternating current (AC) and low voltage class 2 power receptacles, comprises: an electrically insulated housing; a mounting strap attached to the electrically insulated housing and adapted to secure the housing to a branch circuit outlet box; an AC receptacle having a hot contact coupled to a hot AC connection terminal, a neutral contact coupled to a neutral AC connection terminal, and a ground contact coupled to a ground AC connection terminal in the insulated housing; an arc-fault circuit interrupter (AFCI) coupled between the AC receptacle and the connection terminals so that if a ground fault event occurs the AFCI will disconnect the AC receptacle from a source AC voltage connected to the AC connection terminals; an AC line to low voltage direct current (DC) power supply having an AC input coupled to the AC receptacle and a low voltage DC output; and at least one class 2 power receptacle coupled to the low voltage DC output of the AC to low voltage DC power supply, wherein the at least one class 2 power receptacle provides voltage and current for charging a battery in a portable battery operated electronic device.

According to yet another specific example embodiment of this disclosure, a wiring device having line voltage alternating current (AC) and low voltage class 2 power receptacles, comprises: an electrically insulated housing; a mounting strap attached to the electrically insulated housing and adapted to secure the housing to a branch circuit outlet box; an AC receptacle having a hot contact coupled to a hot AC connection terminal, a neutral contact coupled to a neutral AC connection terminal, and a ground contact coupled to a ground AC connection terminal in the insulated housing; an AC line to low voltage direct current (DC) power supply having an AC input coupled to the AC receptacle and a low voltage DC output; at least one class 2 power receptacle coupled to the low voltage DC output of the AC to low voltage DC power supply, wherein the at least one class 2 power receptacle provides voltage and current for charging a battery in a portable battery operated electronic device; and a data over power wiring interface coupled between data contacts of the at least one class 2 power receptacle and the AC connection terminals.

BRIEF DESCRIPTION OF THE DRAWINGS

For a more complete understanding of the present invention and the advantages thereof, reference is now made to the following description, in conjunction with the accompanying drawings briefly described as follows.

Figure 1:
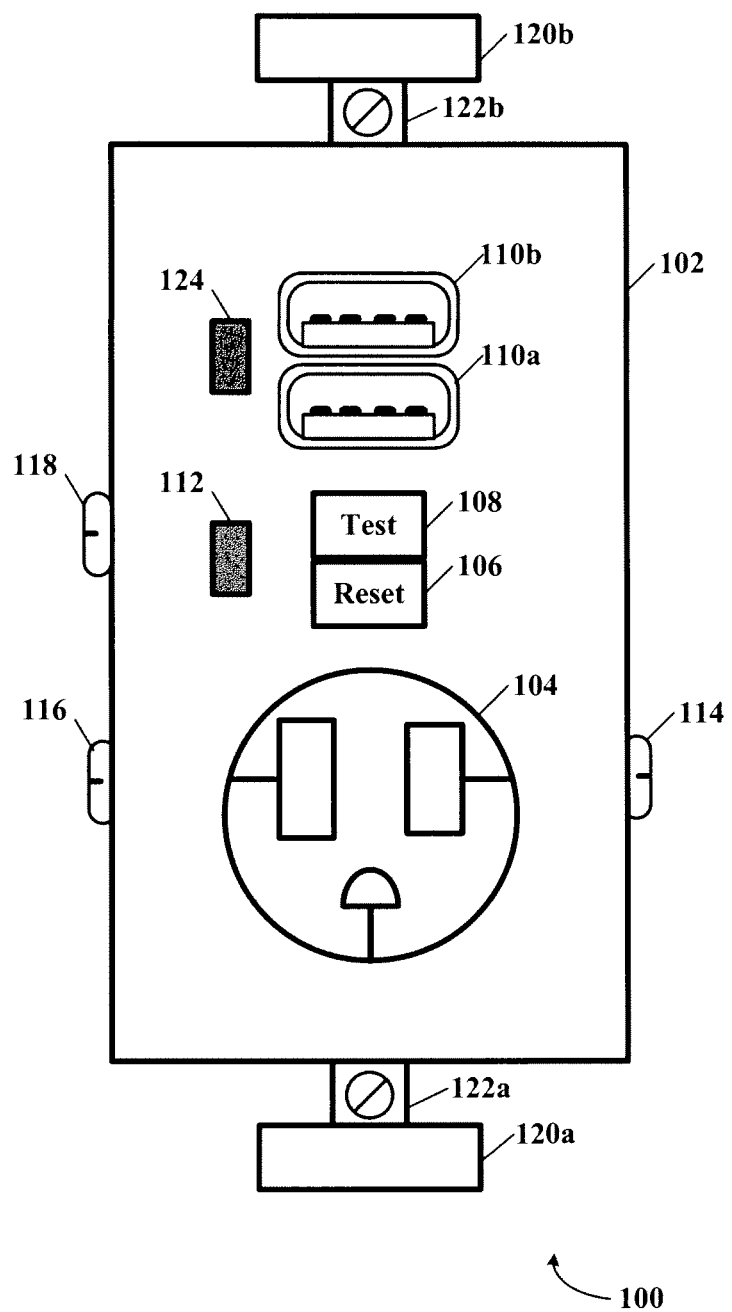
FIG. 1 illustrates a front view of a combination receptacle with class 2 power units configured as a standard single strap flush wall-mount outlet, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Referring now to the drawings, details of an example embodiment of the present invention is schematically illustrated. Like elements in the drawings will be represented by like numbers, and similar elements will be represented by like numbers with a different lower case letter suffix.

Referring to FIG. 1, depicted is a front view of a combination receptacle with class 2 power units configured as a standard single strap flush wall-mount outlet, according to a specific example embodiment of this disclosure. A combination receptacle with class 2 power units, generally represented by the numeral 100, comprises an insulated body 102, a 120 VAC receptacle 104, a reset button 106, a test button 108, a class 2 power outlet 110, a GFCI/AFCI trip indicator light 112, a USB charge/communications indicator light 124, a "hot" wire screw terminal 114, a "neutral" wire screw terminal, a ground screw terminal 118, and outlet box mounting ears 120 configured on a single device strap 122. The combination receptacle 100 is mounted in a recessed branch circuit outlet box (not shown) just like any standard general use AC receptacle. What is especially advantageous using the receptacle with class 2 power units as disclosed herein is that this receptacle 100, in addition to supplying battery charging power to a battery operated device, may be located in a bathroom near a sink, and/or in an occupancy bedroom. Generally, the portable battery operated electronic devices (now shown), e.g., cell phones, PDAs, electronic book readers, portable games players, MP3 music players, digital cameras, portable computers, etc., are charged in a location that is both secure and convenient to the electronic device user. Many of these locations require GFCI and/or AFCI outlet protection pursuant to the National Electrical Code (NEC). With the present invention, both safety and convenience are achieved.

Figure 2:
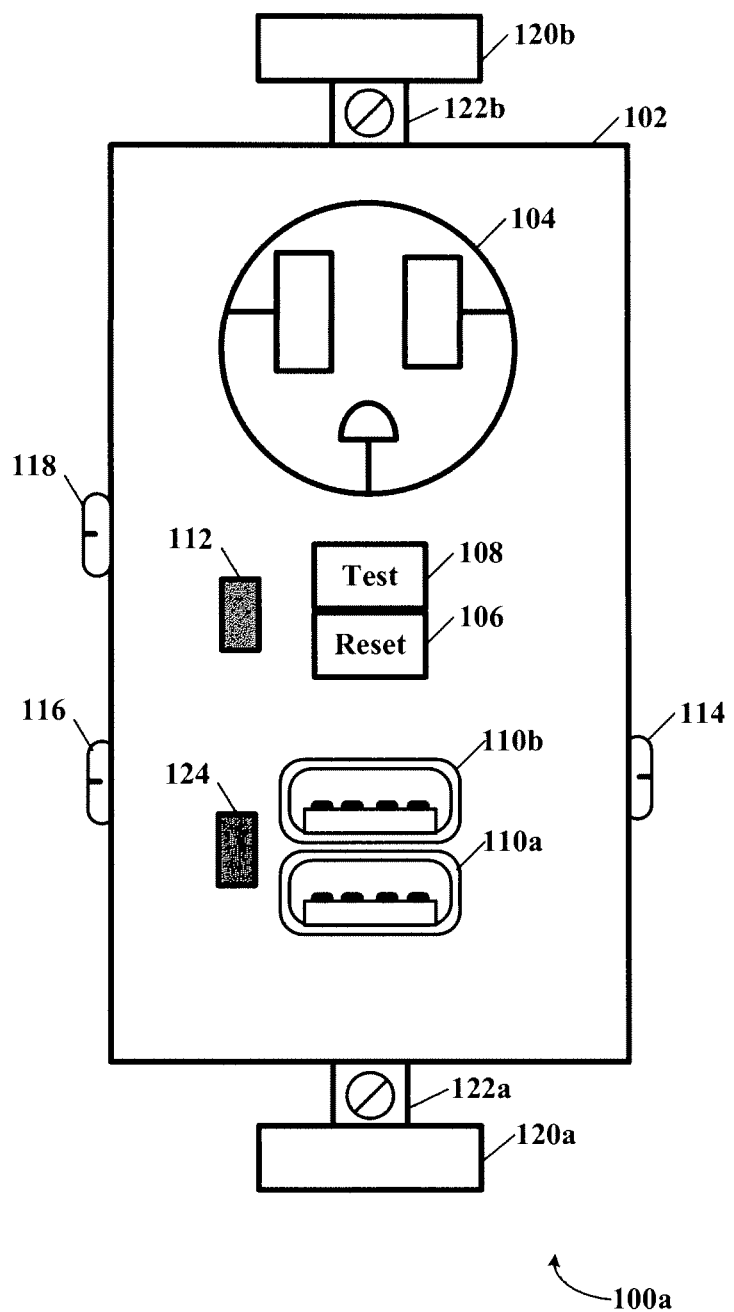
FIG. 2 illustrates a front view of a combination receptacle with class 2 power units configured as a standard single strap flush wall-mount outlet, according to another specific example embodiment of this disclosure.

Referring to FIG. 2, depicted is a front view of a combination receptacle with class 2 power units configured as a standard single strap flush wall-mount outlet, according to another specific example embodiment of this disclosure. A combination receptacle with class 2 power units, generally represented by the numeral 100*a*, comprises similar features to the combination receptacle with class 2 power units 100 and 100*a* shown in FIG. 1 but with the 120 VAC receptacle 104 located above the class 2 power outlet 110. This arrangement may be advantageous in certain situations.

Figure 3:
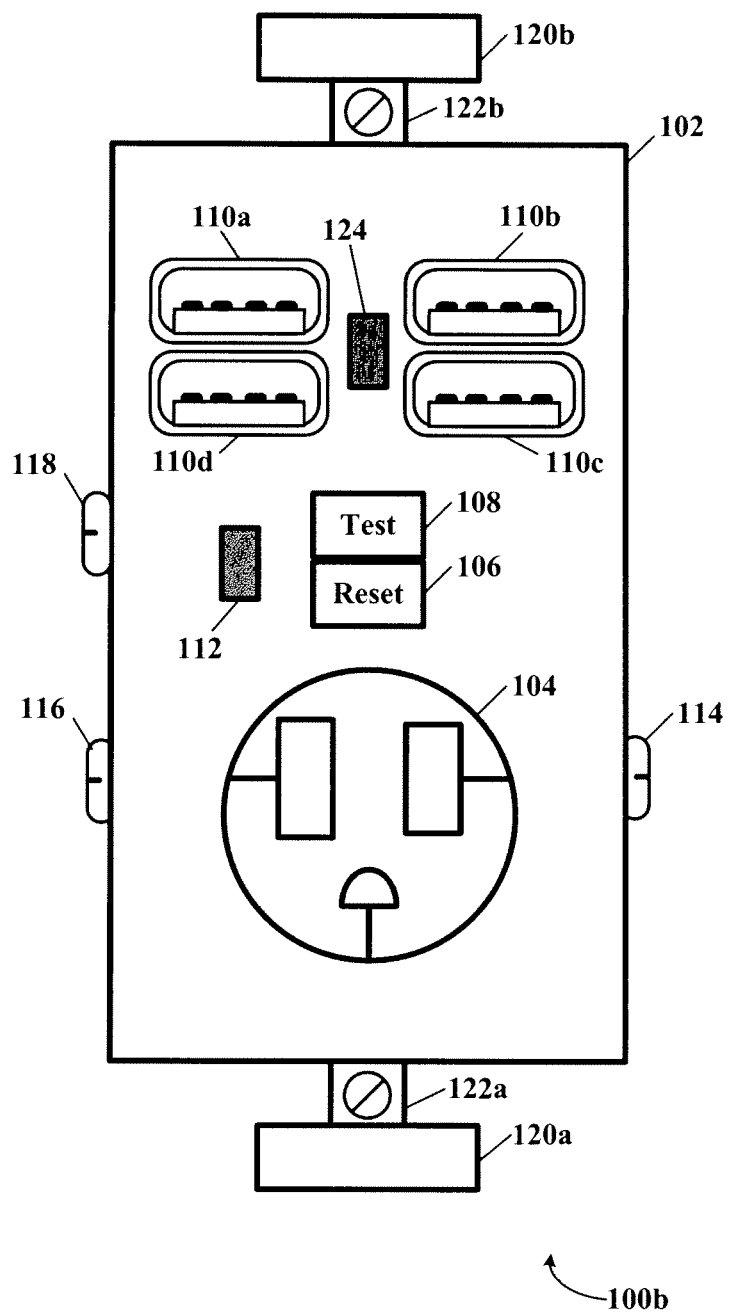
FIG. 3 illustrates a front view of a combination receptacle with class 2 power units configured as a standard single strap flush wall-mount outlet, according to yet another specific example embodiment of this disclosure.

Referring to FIG. 3, depicted is a front view of a combination receptacle with class 2 power units configured as a standard single strap flush wall-mount outlet, according to another specific example embodiment of this disclosure. A combination receptacle with class 2 power units, generally represented by the numeral 100*b*, comprises similar features to the combination receptacle with class 2 power units 100 shown in FIG. 1 but with more class 2 power unit available for charging of the portable battery operated electronic devices (not shown) through standard USB cables and the like.

Figure 4:
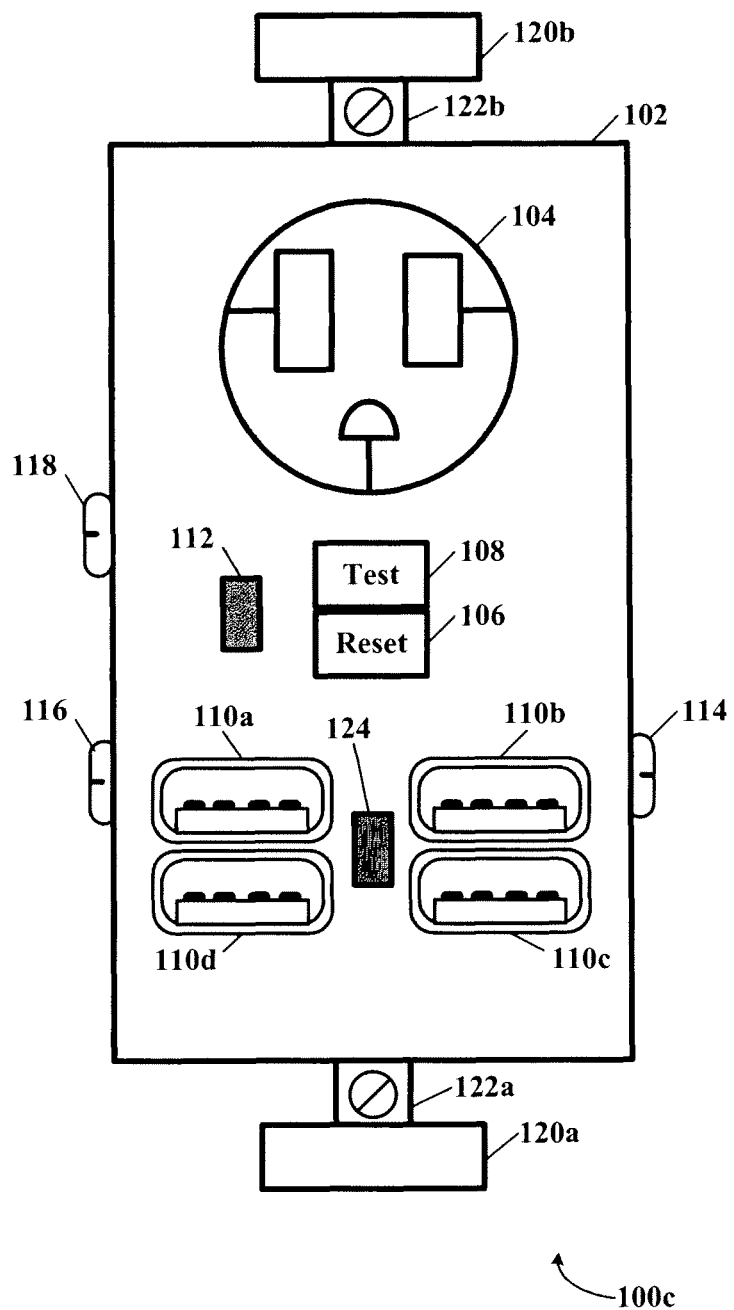
FIG. 4 illustrates a front view of a combination receptacle with class 2 power units configured as a standard single strap flush wall-mount outlet, according to still another specific example embodiment of this disclosure.

Referring to FIG. 4, depicted is a front view of a combination receptacle with class 2 power units configured as a standard single strap flush wall-mount outlet, according to another specific example embodiment of this disclosure. A combination receptacle with class 2 power units, generally represented by the numeral 100*c*, comprises similar features to the combination receptacle with class 2 power units 100 shown in FIG. 2 but with more class 2 power unit available for charging of the portable battery operated electronic devices (not shown) through standard USB cables and the like.

Figure 5:
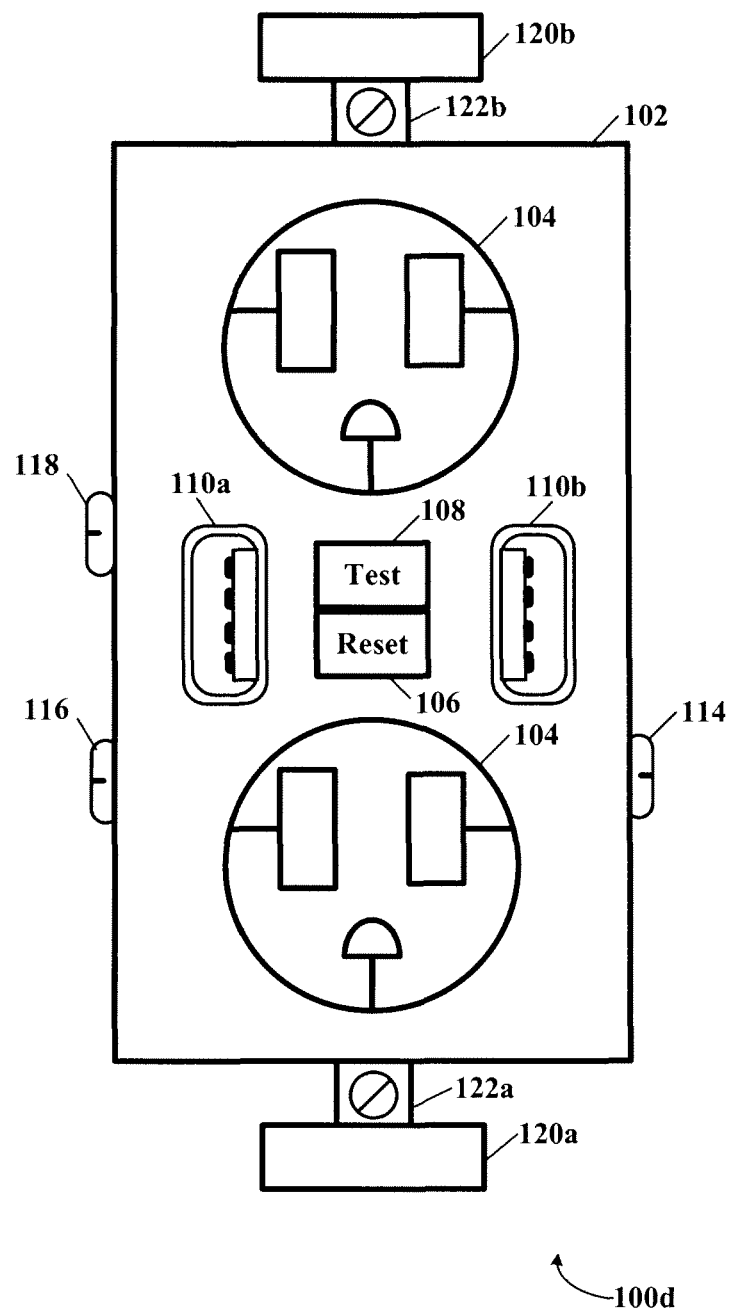
FIG. 5 illustrates a front view of a combination receptacle with class 2 power units configured as a standard single strap flush wall-mount outlet, according to another specific example embodiment of this disclosure.

Referring to FIG. 5, depicted is a front view of a combination receptacle with class 2 power units configured as a standard single strap flush wall-mount outlet, according to another specific example embodiment of this disclosure. A combination receptacle with class 2 power units, generally represented by the numeral 100d, comprises similar features to the combination receptacle with class 2 power units 100 shown in FIGS. 1-4 but with two 120 VAC receptacles 104 and two class 2 power outlets 110 available for charging of the portable battery operated electronic devices (not shown) through standard USB cables and the like.

A significant advantage of the embodiments of the combination receptacle with class 2 power units shown in FIGS. 1, 2, 3, 4 and 5, is that standard (existing) wall plate covers (not shown) may be used (reused) when replacing a standard two socket power outlet with the embodiments of the present invention, or when doing new work construction special wall plates are not required.

Figure 6:
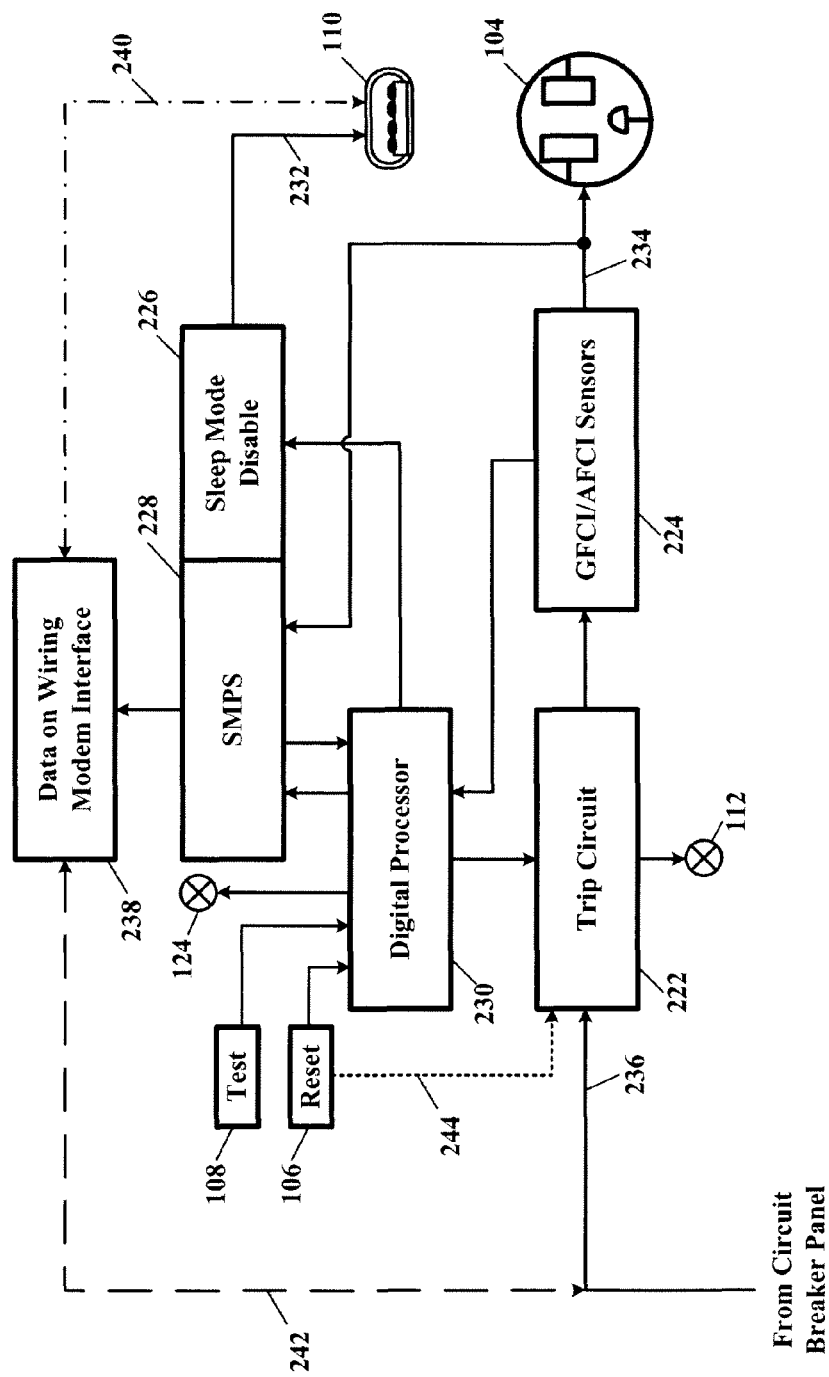
FIG. 6 illustrates a more detailed schematic block diagram of the combination receptacle with class 2 power units shown in FIGS. 1, 2, 3, 4 and 5 in combination with a ground fault circuit interrupter (GFCI) and/or an arc fault circuit interrupter (AFCI), according to the specific example embodiments of this disclosure.

Referring to FIG. 6, depicted is a more detailed schematic block diagram of the combination receptacle with class 2 power units shown in FIGS. 1, 2, 3, 4 and 5 in combination with a ground fault circuit interrupter (GFCI) and/or an arc fault circuit interrupter (AFCI), according to the specific example embodiment of this disclosure. A digital processor 230 with memory (not shown) monitors the load current and/or arc-fault high frequency (HF) noise at the AC supply line 234 to the power receptacle 104. GFCI and/or AFCI sensors provide the current being drawn to and from the hot and neutral supply conductors, and/or HF noise generated by a low level arc-fault up or down stream of the AFCI sensors. When the digital processor 230, e.g., microprocessor, microcontroller, programmable logic array (PLA), application specific integrated circuit (ASIC), etc., determines that a ground-fault or arc-fault event is occurring, the digital processor 230 will cause the trip circuit 222 to trip, thereby removing AC voltage from the faulting load. The test button 108 may be used to functionally test the GFCI and/or AFCI functions of the receptacle 100, and the reset button 106 may be used to reset the trip circuit 222 either mechanically (mechanical reset operation 222) and/or electrically through the digital processor 230. An arc fault protected receptacle device is more fully described in commonly owned U.S. patent application Ser. No. 12/912,711; filed Oct. 26, 2010; entitled "Arc Fault Detection Method and Apparatus" by Carlos Eduardo Restrepo, Kallikuppa Muniyappa Sreenivasa, Kantesh Vittal Agnihotri, Manishkumar Natwarlal Shah and Srikanth Soma; and is hereby incorporated by reference herein for all purposes.

The at least one class 2 power outlet 110 has power supplied to it from a switch mode power supply (SMPS) 228 that may be configured with a sleep mode disable function 226 so that when no current is being drawn by the portable battery operated electronic device under charging conditions, the sleep mode disable function 226 will substantially reduce any current drawn from the AC supply line 234 caused by operation of the SMPS 228 without load. Thereby substantially reducing phantom or "vampire" wasteful current drawn by the SMPS 228 when the battery charging load in the portable device is not connected thereto. The SMPS 228 may be controlled by a pulse width modulation (PWM) signal that may be derived from the digital processor 230, as is well known to one having ordinary skill in the art of SMPS design and the benefit of this disclosure. The at least one class 2 power outlet 110 may be for example, but is not limited to, a Universal Serial Bus (USB) interface having plus 5 volts on pin 1 and ground on pin 4, and output current capabilities of at least 500 milliamperes per outlet 110. The SMPS 228 may also be a power factor corrected flyback switch mode power supply.

Having a convenient power supply connection to a USB outlet 110 opens up the possibility of providing an inexpensive data interface to a residence or business "smart" wiring system that provides for data transmission over the AC power wiring for control of lights and appliances, Ethernet interfacing, etc., without the need for special low voltage control wiring. See for example, HomePlug PowerLine Alliance at http://www.homeplug.org/home/. A data modem interface 238 may be added and coupled to the Data + and Data − terminals 3 and 2, respectively, of the USB outlet 110. The low level digital data signals from and to the USB outlet 110 are carried over the low voltage digital data circuit 240 and converted to data over power wiring compatible signals for transfer over the line voltage wiring 242 to the source side AC line 236. Thus a PDA or PC may have its battery charging while a user is monitoring and controlling an occupancy having the smart wiring system.

The GFCI/AFCI trip indicator light 112 indicates when the trip circuit 222 has been tripped. The USB charge/communications indicator light 124 indicates when a USB connected portable device is being charged and/or when there is data communications through a class 2 power outlet 110.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A wiring device having line voltage alternating current (AC) and low voltage class 2 power receptacles, comprises:
   an electrically insulated housing;
   a mounting strap attached to the electrically insulated housing and adapted to secure the housing to a branch circuit outlet box;
   an AC receptacle having a hot contact coupled to a hot AC connection terminal, a neutral contact coupled to a neutral AC connection terminal, and a ground contact coupled to a ground AC connection terminal in the insulated housing;
   a ground-fault circuit interrupter (GFCI) coupled between the AC receptacle and the AC connection terminals so that if a ground fault event occurs the GFCI will disconnect the AC receptacle from a source AC voltage connected to the AC connection terminals;
   an AC line to low voltage direct current (DC) power supply having an AC input coupled to the AC receptacle and a low voltage DC output;
   at least one class 2 power receptacle coupled to and receiving power from the low voltage DC output of the AC to low voltage DC power supply, wherein the at least one class 2 power receptacle provides voltage and current for charging a battery in a portable battery operated electronic device; and a sleep mode circuit for placing the AC line to low voltage DC power supply, that supplies power to the at least one class 2 power receptacle and is coupled to the at least one class 2 power receptacle, into a low power sleep mode when substantially no current is being drawn through the at least one class 2 power receptacle to substantially reduce vampire power drawn by a load coupled to the at least one class 2 power receptacle.

2. The wiring device according to claim 1, further comprising an arc-fault circuit interrupter (AFCI) coupled between the AC receptacle and the AC connection terminals so that if an arc-fault event occurs the AFCI will disconnect the AC receptacle from the source AC voltage.

3. The wiring device according to claim 1, wherein the AC line to low voltage DC power supply is a switch mode power supply (SMPS).

4. The wiring device according to claim 3, wherein the SMPS is controlled with a pulse width modulated signal from a digital processor.

5. The wiring device according to claim 1, wherein the at least one class 2 power receptacle is at least one Universal Serial Bus (USB) receptacle.

6. The wiring device according to claim 1, further comprising a carrier current interface coupled between data contacts of the at least one class 2 power receptacle and the AC connection terminals.

7. The wiring device according to claim 1, wherein the at least one class 2 power receptacle is located above the AC receptacle.

8. The wiring device according to claim 1, wherein the at least one class 2 power receptacle is located below the AC receptacle.

9. The wiring device according to claim 1, wherein a standard wall cover plate is used to finish installation of the wiring device in a wall outlet box.

10. The wiring device according to claim 1, further comprising an indicator light that indicates:
 data communication, when the at least one class 2 power receptacle is being used for data communication, and
 a class 2 power supply based charging, when the at least one class 2 power receptacle is being used for charging a device coupled to the at least one class 2 power receptacle.

11. A wiring device having line voltage alternating current (AC) and low voltage class 2 power receptacles, comprises:
 an electrically insulated housing;
 a mounting strap attached to the electrically insulated housing and adapted to secure the housing to a branch circuit outlet box;
 an AC receptacle having a hot contact coupled to a hot AC connection terminal, a neutral contact coupled to a neutral AC connection terminal, and a ground contact coupled to a ground AC connection terminal in the insulated housing;
 an arc-fault circuit interrupter (AFCI) coupled between the AC receptacle and the AC connection terminals so that if an arc-fault event occurs the AFCI will disconnect the AC receptacle from a source AC voltage connected to the AC connection terminals;
 an AC line to low voltage direct current (DC) power supply having an AC input coupled to the AC receptacle and a low voltage DC output;
 at least one class 2 power receptacle coupled to and receiving power from the low voltage DC output of the AC to low voltage DC power supply, wherein the at least one class 2 power receptacle provides voltage and current for charging a battery in a portable battery operated electronic device; and
 a sleep mode circuit for placing the AC line to low voltage DC power supply, that supplies power to the at least one class 2 power receptacle and is coupled to the at least one class 2 power receptacle, into a low power sleep mode when substantially no current is being drawn through the at least one class 2 power receptacle to substantially reduce vampire power consumption.

12. The wiring device according to claim 11, further comprising a ground-fault circuit interrupter (GFCI) coupled between the AC receptacle and the AC connection terminals so that if a ground-fault event occurs the GFCI will disconnect the AC receptacle from the source AC voltage.

13. The wiring device according to claim 11, wherein the AC line to low voltage DC power supply is a switch mode power supply (SMPS).

14. The wiring device according to claim 13, wherein the SMPS is controlled with a pulse width modulated signal from a digital processor.

15. The wiring device according to claim 11, wherein the at least one class 2 power receptacle is at least one Universal Serial Bus (USB) receptacle.

16. The wiring device according to claim 11, further comprising a carrier current interface coupled between data contacts of the at least one class 2 power receptacle and the AC connection terminals.

17. The wiring device according to claim 11, wherein the at least one class 2 power receptacle is located above the AC receptacle.

18. The wiring device according to claim 11, wherein the at least one class 2 power receptacle is located below the AC receptacle.

19. The wiring device according to claim 11, wherein a standard wall cover plate is used to finish installation of the wiring device in a wall outlet box.

20. The wiring device according to claim 11, further comprising an indicator light that indicates:
 data communication, when the at least one class 2 power receptacle is being used for data communication, and
 a class 2 power supply based charging, when the at least one class 2 power receptacle is being used for charging a device coupled to the at least one class 2 power receptacle.

21. A wiring device having line voltage alternating current (AC) and low voltage class 2 power receptacles, comprises:
 an electrically insulated housing;
 a mounting strap attached to the electrically insulated housing and adapted to secure the housing to a branch circuit outlet box;
 an AC receptacle having a hot contact coupled to a hot AC connection terminal, a neutral contact coupled to a neutral AC connection terminal, and a ground contact coupled to a ground AC connection terminal in the insulated housing;
 an AC line to low voltage direct current (DC) power supply having an AC input coupled to the AC receptacle and a low voltage DC output;
 at least one class 2 power receptacle coupled to and receiving power from the low voltage DC output of the AC to low voltage DC power supply, wherein the at least one class 2 power receptacle provides voltage and current for charging a battery in a portable battery operated electronic device;

a data over power wiring interface coupled between data contacts of the at least one class 2 power receptacle and the AC connection terminals; and a sleep mode circuit for placing the AC line to low voltage DC power supply, that supplies power to the at least one class 2 power receptacle and is coupled to the at least one class 2 power receptacle, into a low power sleep mode when substantially no current is being drawn through the at least one class 2 power receptacle to substantially reduce a vampire power consumption associated with a load coupled to the at least one class 2 power receptacle.

22. The wiring device according to claim 21, wherein the AC line to low voltage DC power supply is a switch mode power supply (SMPS).

23. The wiring device according to claim 22, wherein the SMPS is controlled with a pulse width modulated signal from a digital processor.

24. The wiring device according to claim 21, wherein the at least one class 2 power receptacle is at least one Universal Serial Bus (USB) receptacle.

25. The wiring device according to claim 21, wherein the at least one class 2 power receptacle is located above the AC receptacle.

26. The wiring device according to claim 21, wherein the at least one class 2 power receptacle is located below the AC receptacle.

27. The wiring device according to claim 21, wherein a standard wall cover plate is used to finish installation of the wiring device in a wall outlet box.

28. The wiring device according to claim 21, further comprising an indicator light that indicates:

data communication, when the at least one class 2 power receptacle is being used for data communication, and a class 2 power supply based charging, when the at least one class 2 power receptacle is being used for charging a device coupled to the at least one class 2 power receptacle.

\* \* \* \* \*